(12) United States Patent
Hahm et al.

(10) Patent No.: US 10,939,794 B2
(45) Date of Patent: Mar. 9, 2021

(54) DISH WASHER

(71) Applicant: Samsung Electronics Co., Ltd, Suwon-si (KR)

(72) Inventors: Jung Yoon Hahm, Seongnam-si (KR); Ji Won Yoon, Suwon-si (KR); Jung Chan Ryu, Yongin-si (KR); Jae Woo Lee, Seoul (KR); Jun-Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

(21) Appl. No.: 15/988,291

(22) Filed: May 24, 2018

(65) Prior Publication Data

US 2018/0338667 A1 Nov. 29, 2018

(30) Foreign Application Priority Data

May 26, 2017 (KR) ........................ 10-2017-0065081

(51) Int. Cl.
*A47L 15/00* (2006.01)
*A47L 15/23* (2006.01)
(Continued)

(52) U.S. Cl.
CPC .......... *A47L 15/4219* (2013.01); *A47L 15/00* (2013.01); *A47L 15/0013* (2013.01);
(Continued)

(58) Field of Classification Search
CPC .. A47L 15/00; A47L 15/0013; A47L 15/0084; A47L 15/23; A47L 15/4208;
(Continued)

(56) References Cited

U.S. PATENT DOCUMENTS 7,585,373 B2 9/2009 Jerg et al.
8,231,737 B2 7/2012 Iwanaga et al.
(Continued)

FOREIGN PATENT DOCUMENTS

CN 2340360 Y 9/1999
CN 1899197 A 1/2007
(Continued)

OTHER PUBLICATIONS

European Patent Office, "European Search Report," Application No. EP18173528.3, dated Nov. 6, 2018, 9 pages.
(Continued)

*Primary Examiner* — Levon J Shahinian

(57) ABSTRACT

A dish washer and a control method are disclosed. The dish washer includes a sump and at least one nozzle configured to inject water. The dish washer also includes a distributor configured to receive water of the sump and distribute the water to the at least one nozzle. The dish washer also includes a reservoir configured to receive and store the water of the sump. The dish washer also includes a circulation path configured to connect the sump and the distributor. The dish washer also includes an inflow path configured to branch off from the circulation path to supply the water of the sump to the reservoir. The dish washer also includes a first valve configured to open or close the inflow path and a second valve configured to open or close the outflow path, and the outflow path is configured to flow the water out of the reservoir.

20 Claims, 21 Drawing Sheets

(51) Int. Cl.
*A47L 15/42* (2006.01)
*A47L 15/48* (2006.01)

(52) U.S. Cl.
CPC ........... *A47L 15/0084* (2013.01); *A47L 15/23* (2013.01); *A47L 15/4208* (2013.01); *A47L 15/428* (2013.01); *A47L 15/4214* (2013.01); *A47L 15/4217* (2013.01); *A47L 15/4221* (2013.01); *A47L 15/4291* (2013.01); *A47L 15/486* (2013.01); *A47L 15/488* (2013.01); *A47L 2501/03* (2013.01); *A47L 2501/05* (2013.01); *Y02B 40/00* (2013.01)

(58) Field of Classification Search
CPC ............ A47L 15/4214; A47L 15/4217; A47L 15/4219; A47L 15/4221; A47L 15/428; A47L 15/4291; A47L 15/486; A47L 15/488; A47L 2501/03; A47L 2501/05
USPC .................. 134/56 D, 57 D, 58 D, 60, 104.1
See application file for complete search history.

(56) References Cited

U.S. PATENT DOCUMENTS

| | | | |
|---|---|---|---|
| 8,449,690 | B2 | 5/2013 | Jeong et al. |
| 9,510,725 | B2 | 12/2016 | Lee et al. |
| 10,362,924 | B2 | 7/2019 | Lee et al. |
| 2008/0264458 | A1* | 10/2008 | Berner .................. A47L 15/483 134/57 D |
| 2011/0114140 | A1 | 5/2011 | Heisele et al. |
| 2011/0139197 | A1 | 6/2011 | Jerg et al. |
| 2012/0145193 | A1 | 6/2012 | Buser et al. |
| 2014/0060579 | A1 | 3/2014 | Slabbekoorn et al. |
| 2014/0238450 | A1 | 8/2014 | Bertram et al. |
| 2016/0242619 | A1 | 8/2016 | Hong et al. |

FOREIGN PATENT DOCUMENTS

| | | |
|---|---|---|
| CN | 1913822 A | 2/2007 |
| CN | 101822521 A | 9/2010 |
| CN | 202179514 U | 4/2012 |
| CN | 104622403 A | 5/2015 |
| CN | 105902248 A | 8/2016 |
| EP | 1827198 A1 | 9/2007 |
| EP | 2327349 A1 | 6/2011 |
| EP | 2328458 A1 | 6/2011 |
| EP | 2534996 A1 | 12/2012 |
| EP | 2570069 A1 | 3/2013 |
| FR | 2993166 A1 | 1/2014 |
| KR | 10-2009-0037279 A | 4/2009 |
| KR | 10-2014-0101632 A | 8/2014 |
| KR | 10-2014-0101633 A | 8/2014 |

OTHER PUBLICATIONS

Office Action dated Aug. 21, 2020 in connection with Chinese Patent Application No. 201810513094.0, 19 pages.

* cited by examiner

DISH WASHER

CROSS-REFERENCE TO RELATED APPLICATION

This application is related to and claims the benefit of Korean Patent Application No. 10-2017-0065081 filed on May 26, 2017, the contents of which are incorporated herein by reference.

TECHNICAL FIELD

The present disclosure relates to dish washers, and more particularly, to a dish washer having a water tank capable of recycling water and a dryer for blowing air into the dish washer to dry dishes.

BACKGROUND

Dish washers are home appliances equipped with a cabinet having a washing tub, a basket for receiving dishes, a sump for storing water, a nozzle for spraying water, and a pump for supplying water of the sump to the nozzle, for washing dishes by spraying high pressure water to the dishes.

The dish washer has washing, rinsing, and drying courses, and completes a cycle when the drying course is finished. Water is supplied to each course except the drying course. The supplied water is used to wash and rinse the dishes during the courses and the used water is drained after completion of each course.

The dish washer equipped with a water tank does not drain but store the water left in the sump in the water tank after one cycle is completed and may recycle the water stored in the water tank when a new cycle begins.

The dish washer has also a dryer for sucking in air from the outside of the dish washer and blowing the air into the dish washer to dry the dishes.

SUMMARY

The present disclosure provides a dish washer having a water tank for recycling water with an improved structure in which energy is saved and hygiene is improved.

The present disclosure also provides a dish washer having a dryer with an improved structure in which drying efficiency and reliability are improved.

In accordance with an aspect of the present disclosure, a dish washer includes a sump; at least one nozzle provided to inject water; a distributor provided to receive water of the sump and distribute the water to the at least one nozzle; a reservoir provided to receive the water of the sump and store the water; a circulation path provided to connect the sump and the distributor; an inflow path provided to branch off from the circulation path to supply the water of the sump to the reservoir; a first valve provided in the middle of the inflow path to open or close the inflow path; an outflow path provided to flow out the water of the reservoir; and a second valve provided to open or close the outflow path.

The outflow path may be provided to join the inflow path, and the water of the reservoir may flow out to the sump if both the first valve and the second valve are opened.

The first valve may be provided between a branching point of the circulation path and the inflow path and a joining point of the outflow path and the inflow path.

The second valve may be provided between the reservoir and a joining point of the outflow path and the inflow path.

The first valve may be provided at a position higher than the sump and lower than the distributor.

The second valve may be provided at a position higher than the first valve.

The reservoir may have an inlet linked to the inflow path and an outlet linked to the outlet path, and the inlet and the outlet may be separate from each other and located in different positions.

The inlet may be provided at a position higher than the outlet.

The dish washer may further include a water tank having the reservoir.

The water tank may include at least a part of the inflow path and at least a part of the outflow path.

The dish washer may further include a washing tub, wherein the water tank may include an overflow path provided to guide overly supplied water into the washing tub.

In accordance with an aspect of the present disclosure, a control method of a dish washer having a sump, at least one nozzle, a pump provided to circulate water of the sump, a reservoir provided to receive the water of the sump and store the water, a circulation path connecting the sump and the at least one nozzle, an inflow path branching off from the circulation path and connected to an inlet of the reservoir, and an outflow path connecting an outlet of the reservoir and a point in the inflow path, includes opening or closing the outflow path.

The method may further include blocking water supply to the at least one nozzle through the circulation path; opening the inflow path; closing the outflow path; and activating the pump.

The method may further include allowing water supply to the at least one nozzle through the circulation path; opening the inflow path; closing the outflow path; and activating the pump.

The method may further include opening the inflow path and the outflow path.

In accordance with an aspect of the present disclosure, a dish washer include a cabinet; a washing tub provided inside the cabinet and having an opening; and a dryer provided between the cabinet and the washing tub for sucking in air from the outside of the washing tub and discharging the air into the washing tub through the opening of the washing tub, wherein the dryer includes a duct having a sucking port formed in a top portion and a discharging port formed in a bottom portion to be linked to the opening of the washing tub, and extending in the vertical direction; and a blower fan provided to be adjacent to the sucking port.

The duct may include a slope formed to guide water flowing into the duct to the discharging port.

The dryer may further include a damper provided between the sucking port and the discharging port to open or close the duct.

The dryer may further include a diffuser provided in the discharging port to spread air being discharged through the discharging port, and wherein the diffuser includes a hub, a rim, and a wing extending from the hub to the rim in the radial direction and slantingly formed.

The dish washer may further include a sump, and a water tank equipped on the outside of the washing tub to receive water of the sump and store the water, wherein the duct and the water tank may be integrally formed.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
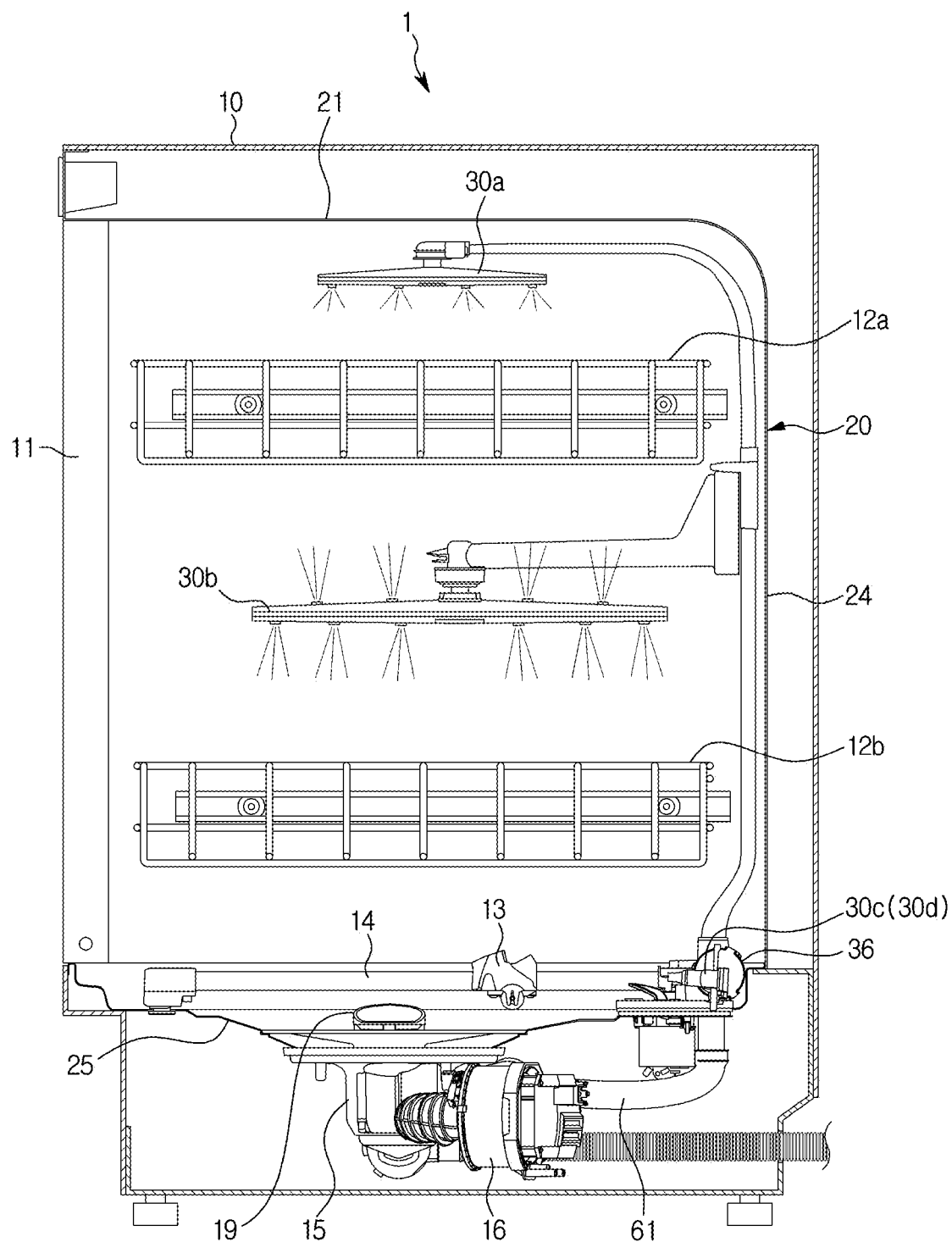
FIG. 1 illustrates a schematic side cross-sectional view of a main configuration of a dish washer, according to various embodiments of the present disclosure.

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure are only the most preferred examples and provided to assist in a comprehensive understanding of the disclosure as defined by the claims and their equivalents. Accordingly, those of ordinary skilled in the art will recognize that various changes and modifications of the embodiments described herein can be made without departing from the scope and spirit of the disclosure.

Reference will now be made in detail to embodiments, examples of which are illustrated in the accompanying drawings, wherein like reference numerals refer to the like elements throughout.

Figure 2:
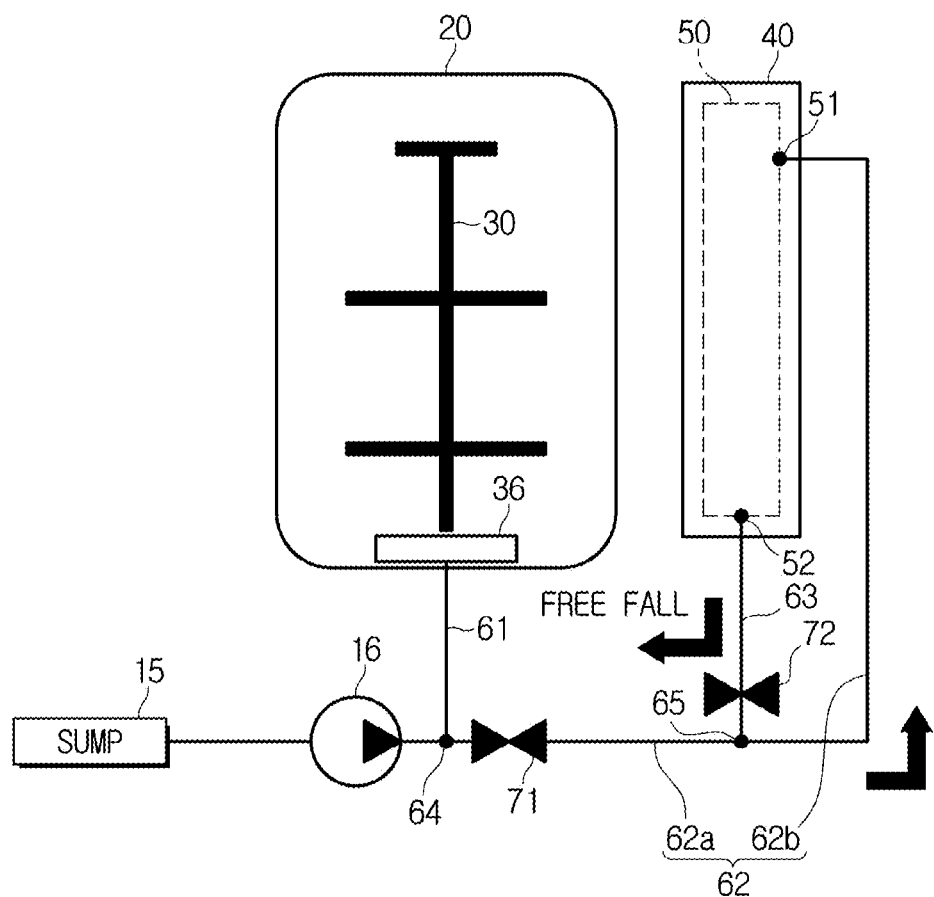
FIG. 2 illustrates a conceptual view of a flow path and valve structure for water recycling of a dish washer, according to various embodiments of the present disclosure.
Figure 3:
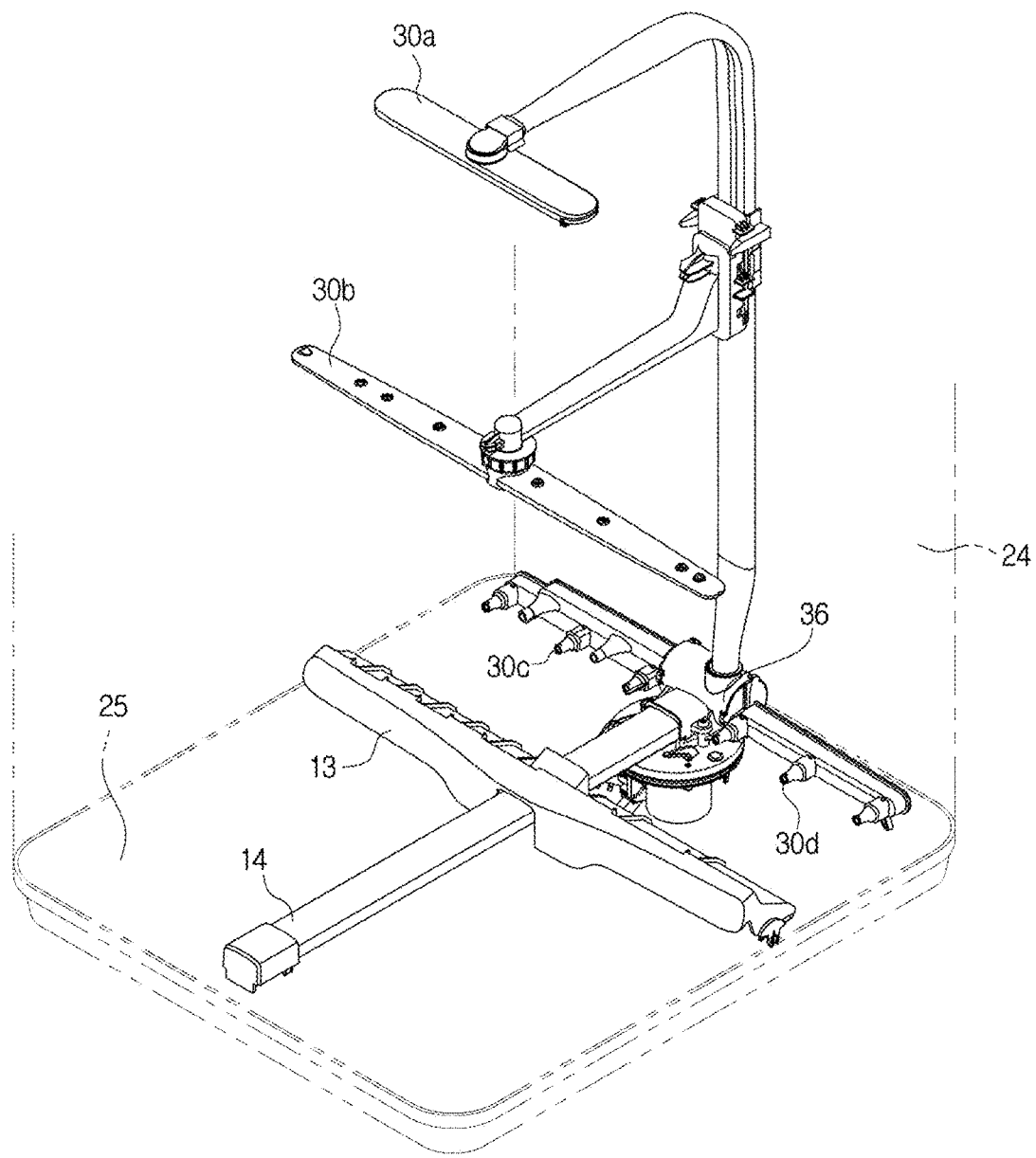
FIG. 3 illustrates a perspective view of a main configuration of the interior of a washing tub of the dish washer of FIG. 1 according to various embodiments of the present disclosure.
Figure 4:
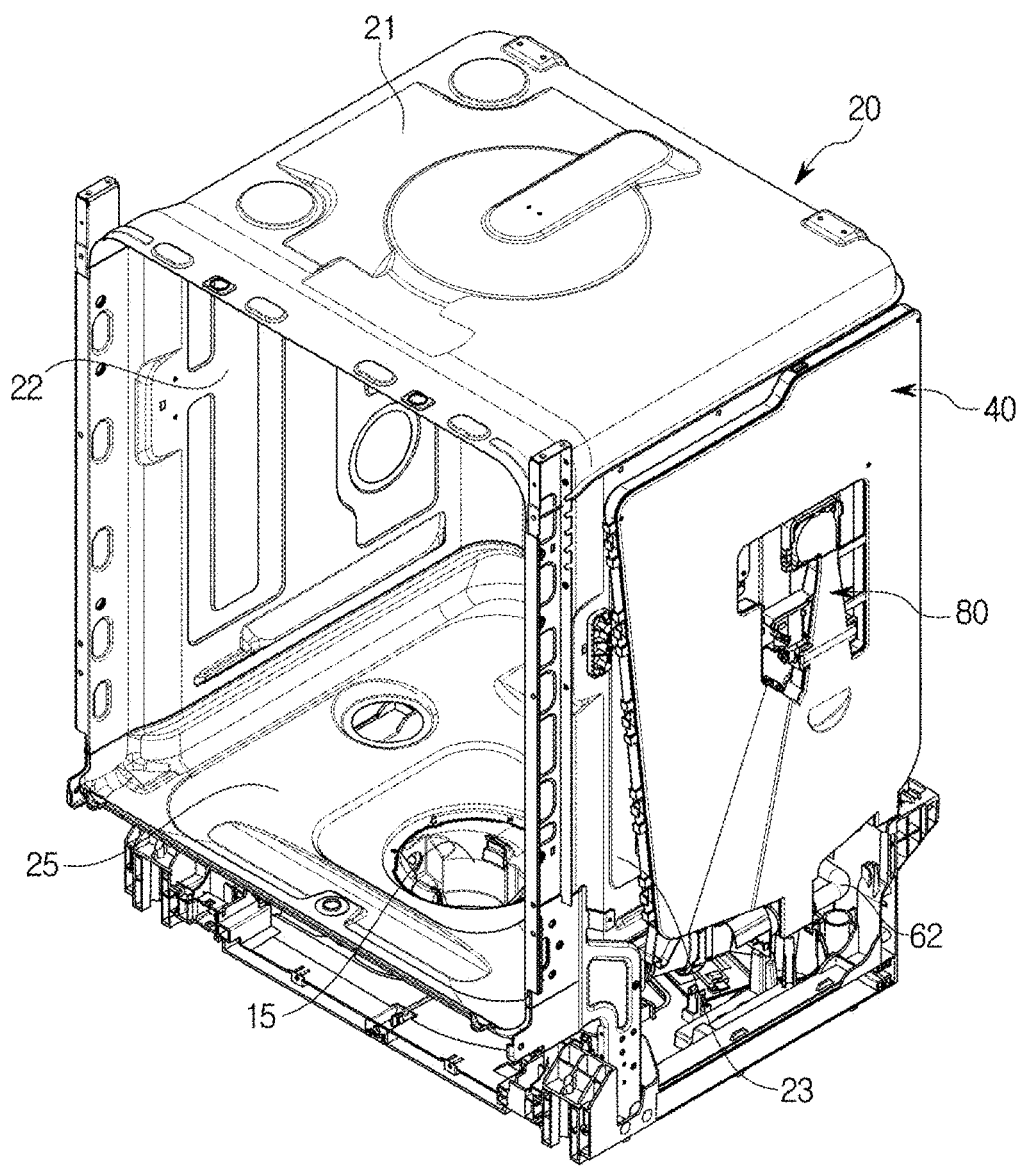
FIG. 4 illustrates a perspective view of the washing tub and a water tank of the dish washer of FIG. 1 according to various embodiments of the present disclosure.
Figure 5:
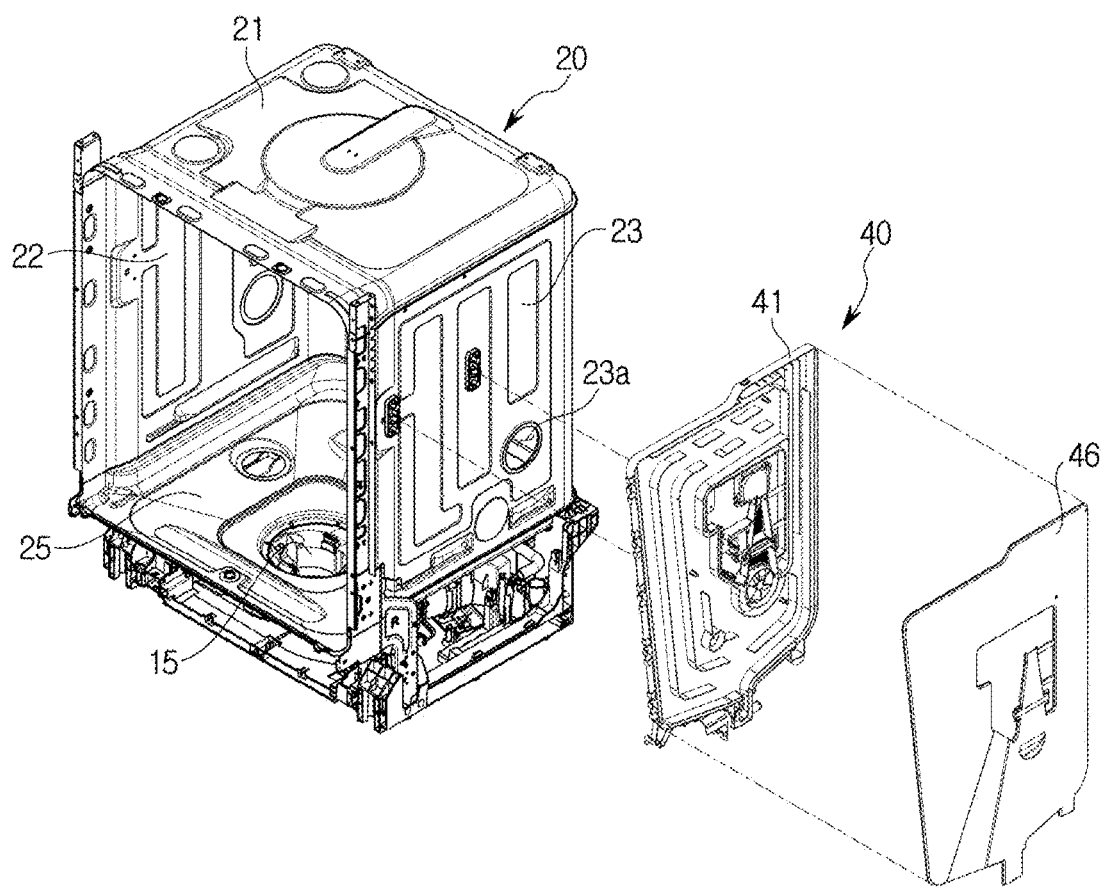
FIG. 5 illustrates a perspective view of the dish washer of FIG. 1 with the washing tub and the water tank separated therefrom according to various embodiments of the present disclosure.
Figure 6:
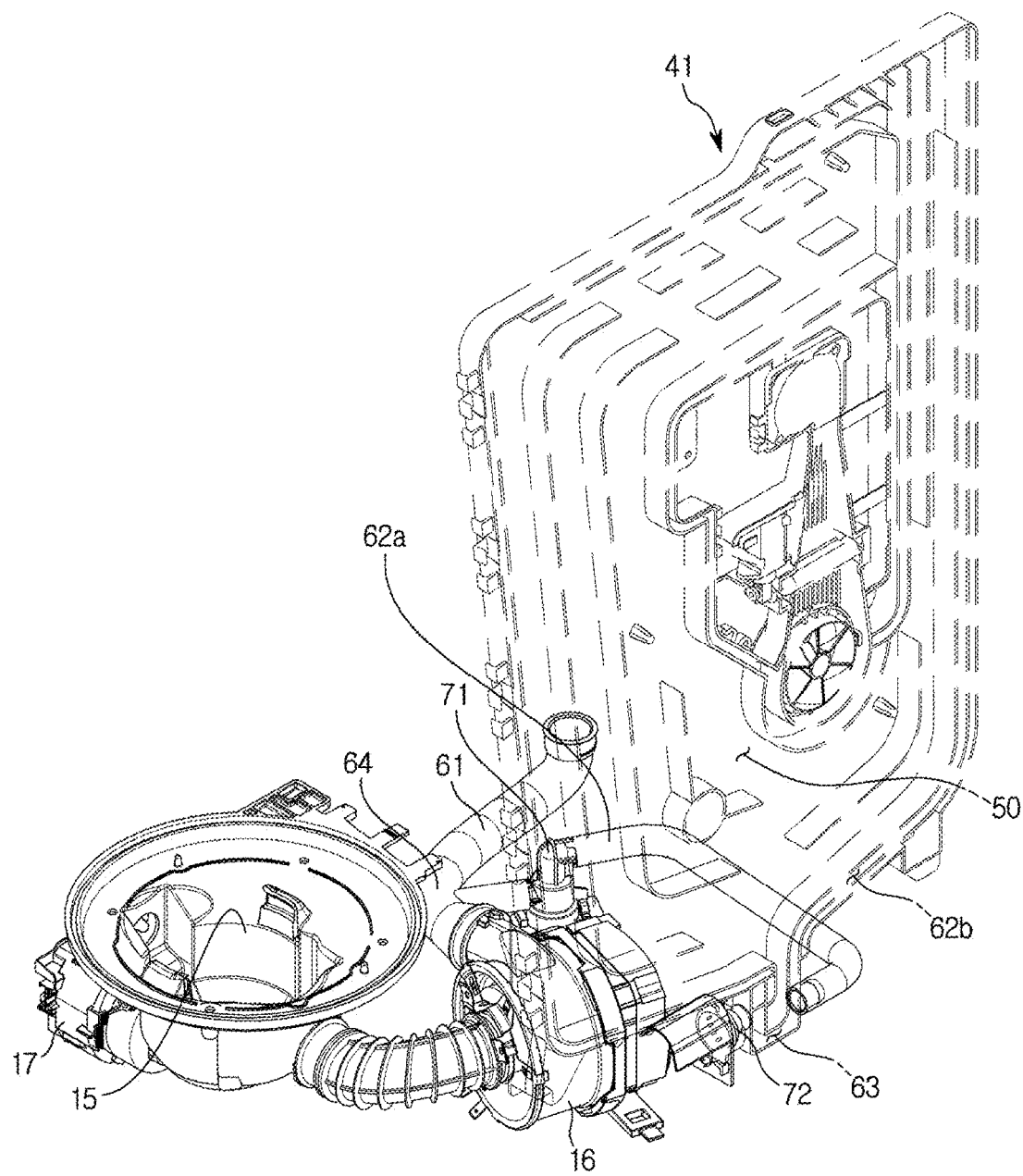
FIG. 6 illustrates a flow path structure between a sump, a distributor, and the water tank of the dish washer of FIG. 1 according to various embodiments of the present disclosure.
Figure 7:
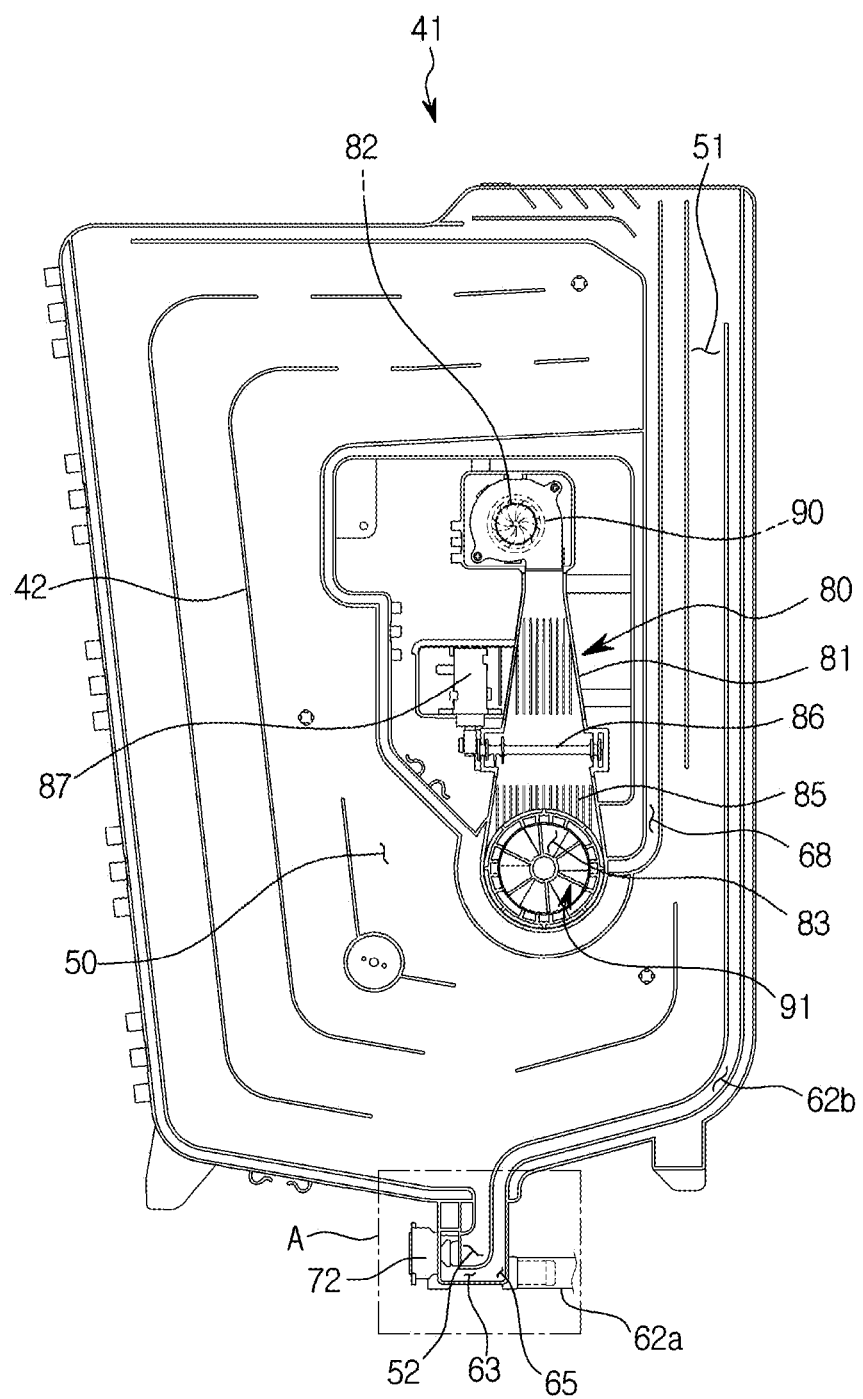
FIG. 7 illustrates an inner plate of the water tank of the dish washer of FIG. 1 according to various embodiments of the present disclosure.
Figure 8:
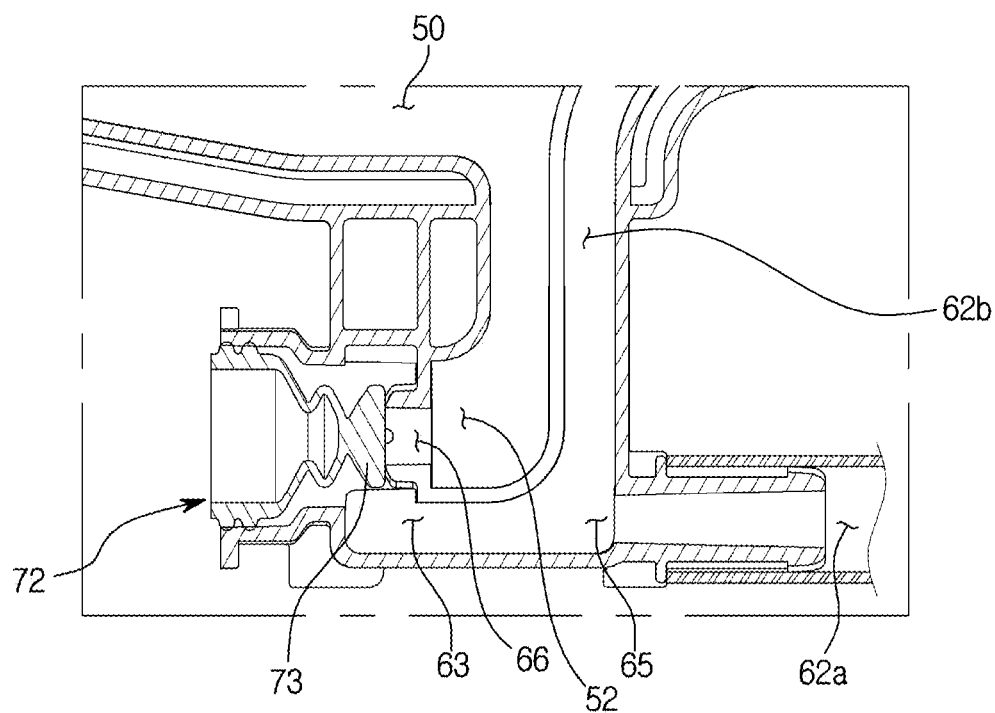
FIG. 8 illustrates an enlarged view of portion A of FIG. 7 according to various embodiments of the present disclosure.
Figure 13:
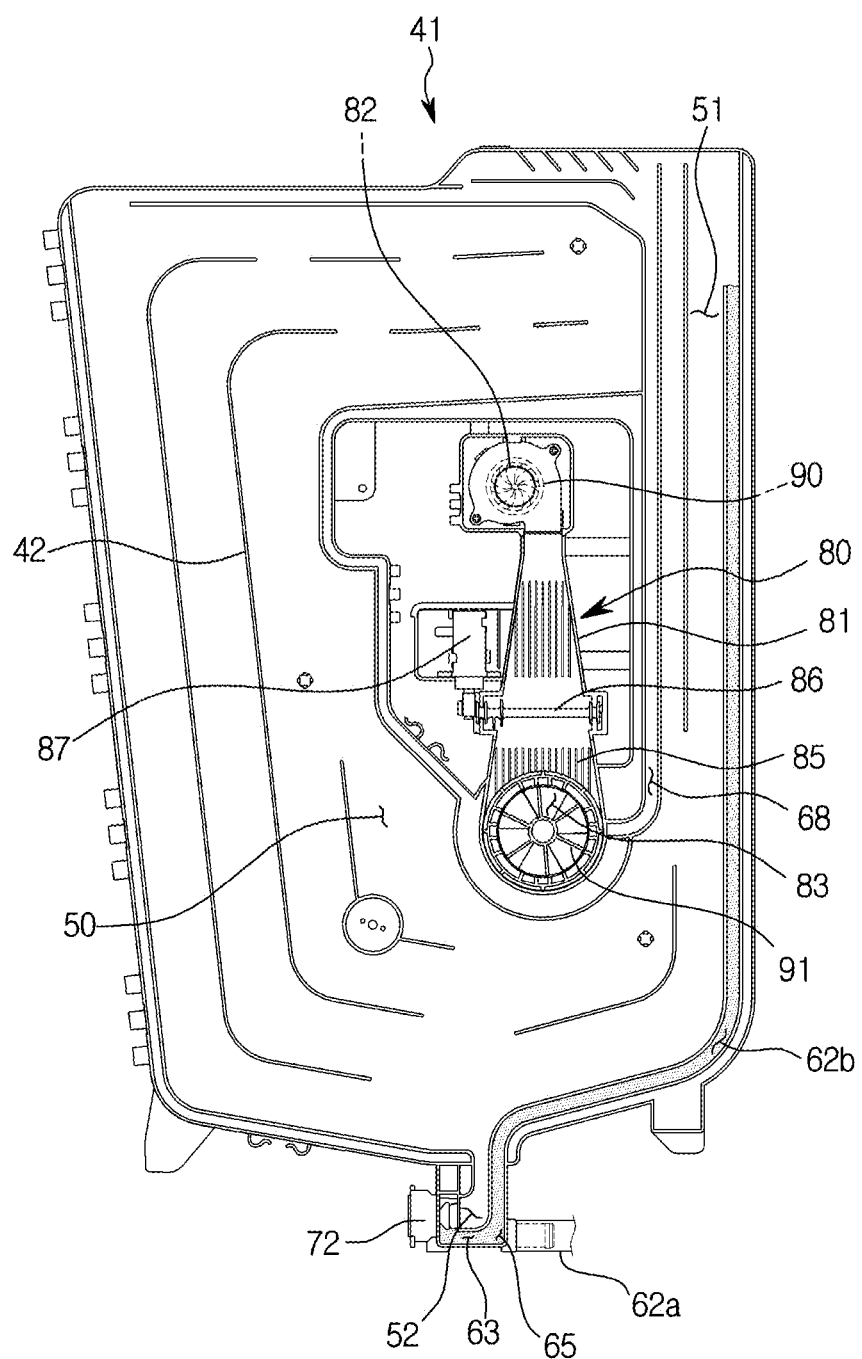
FIGS. 13 to 15 illustrate an operation of filling the water tank of the dish washer of FIG. 1 with water according to various embodiments of the present disclosure.
Figure 14:
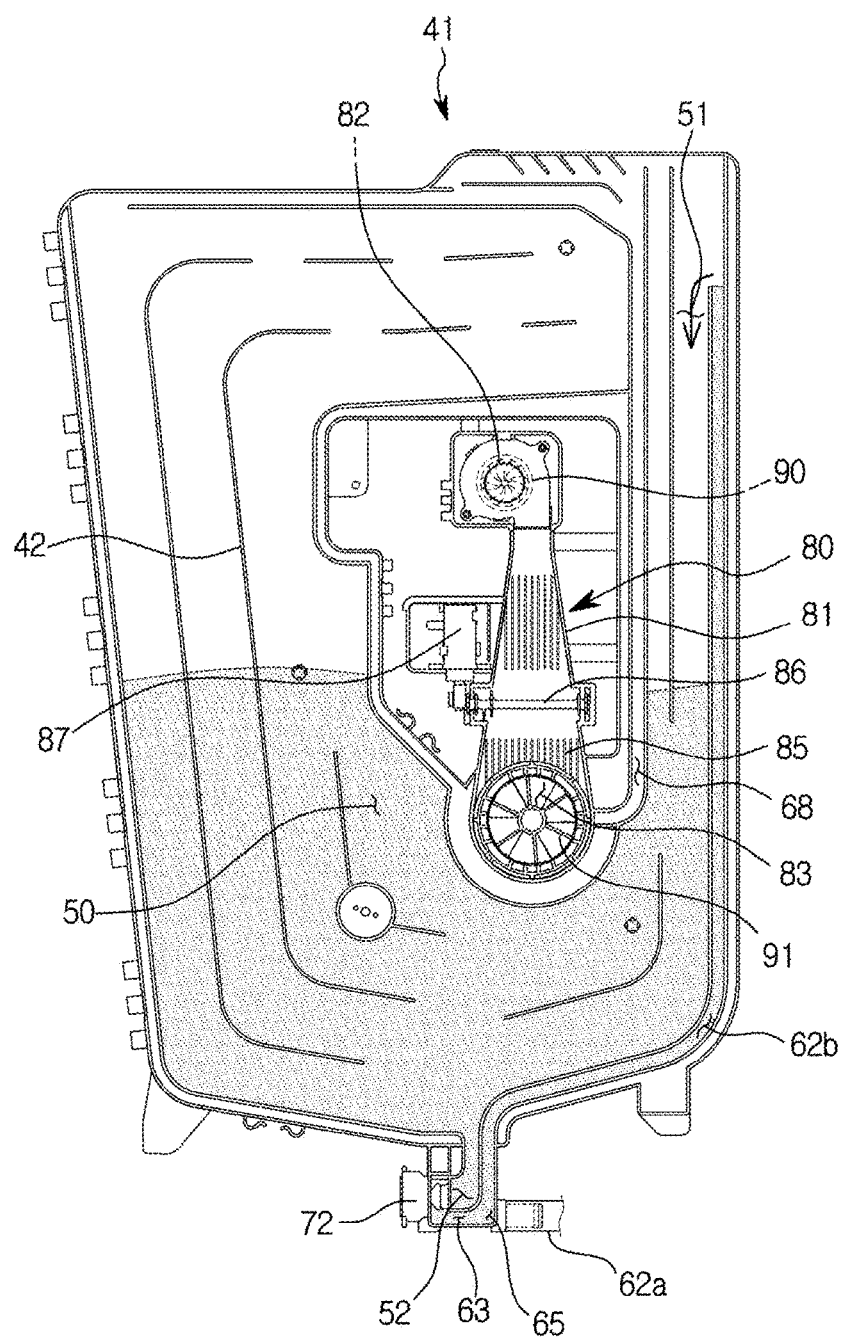
Figure 15:
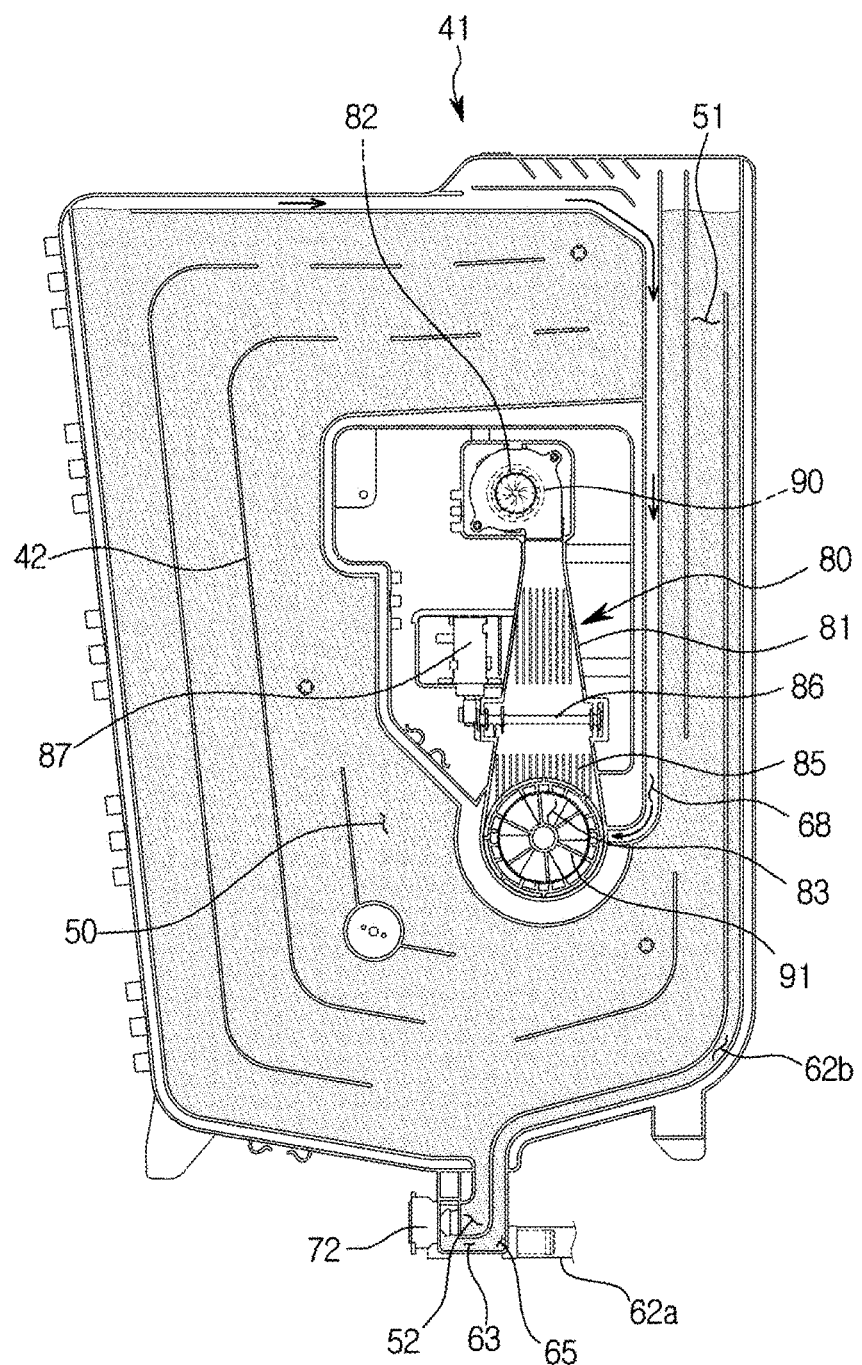
Figure 16:
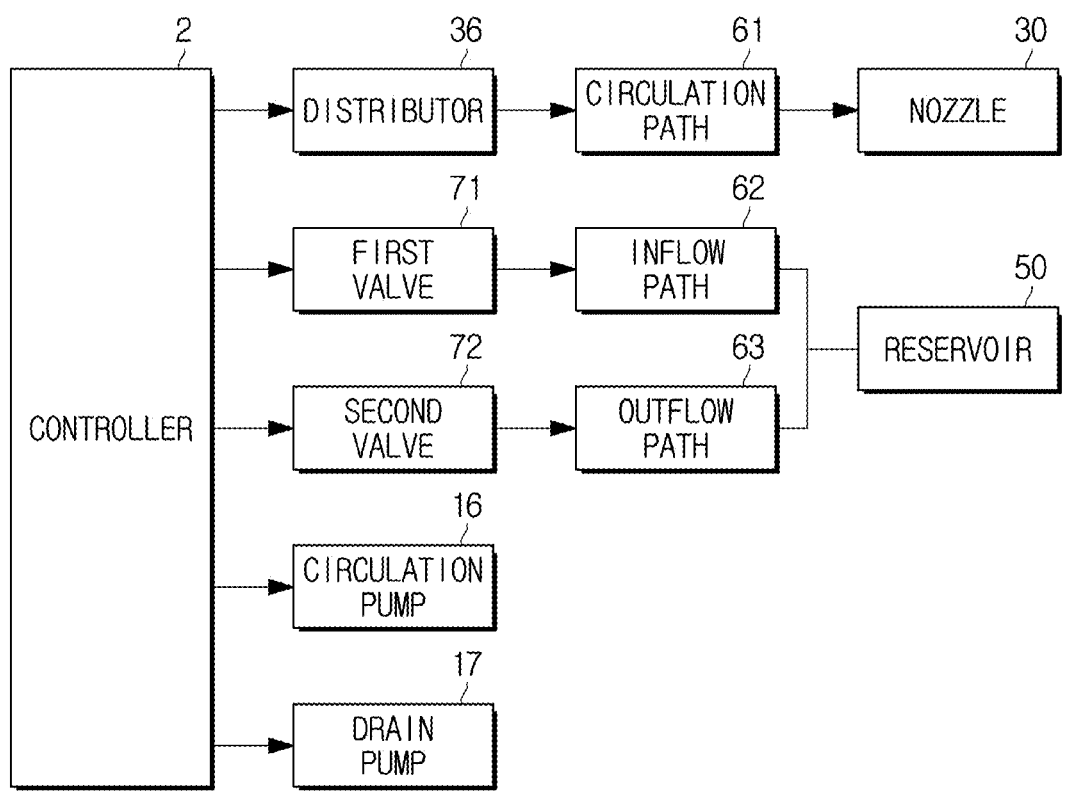
FIG. 16 illustrates a control block diagram of the dish washer of FIG. 1 according to various embodiments of the present disclosure.
Figure 17:
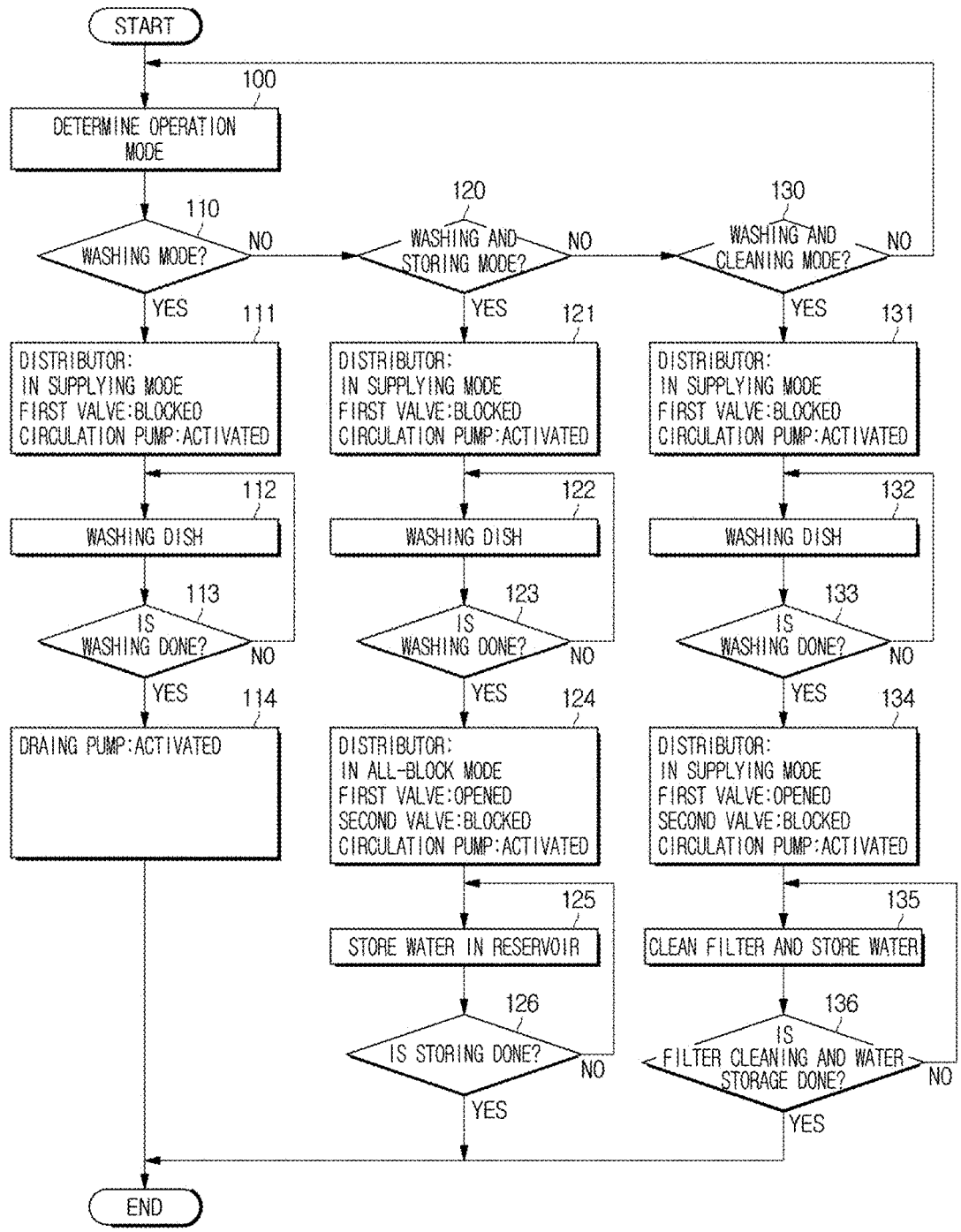
FIG. 17 illustrates a control flowchart of the dish washer of FIG. 1 according to various embodiments of the present disclosure.

FIG. 1 illustrates a schematic side cross-sectional view of a main configuration of a dish washer, according to various embodiments of the present disclosure. FIG. 2 illustrates a conceptual view of a flow path and valve structure for water recycling of a dish washer, according to various embodiments of the present disclosure. FIG. 3 illustrates a perspective view of a main configuration of the interior of a washing tub of the dish washer of FIG. 1 according to various embodiments of the present disclosure. FIG. 4 illustrates a perspective view of the washing tub and a water tank of the dish washer of FIG. 1 according to various embodiments of the present disclosure. FIG. 5 illustrates a perspective view of the dish washer of FIG. 1 with the washing tub and the water tank separated therefrom according to various embodiments of the present disclosure. FIG. 6 illustrates a flow path structure between a sump, a distributor, and the water tank of the dish washer of FIG. 1 according to various embodiments of the present disclosure. FIG. 7 illustrates an inner plate of the water tank of the dish washer of FIG. 1 according to various embodiments of the present disclosure. FIG. 8 illustrates an enlarged view of portion A of FIG. 7 according to various embodiments of the present disclosure. FIGS. 13 to 15 illustrate an operation of filling the water tank of the dish washer of FIG. 1 with water according to various embodiments of the present disclosure. FIG. 16 illustrates a control block diagram of the dish washer of FIG. 1 according to various embodiments of the present disclosure. FIG. 17 illustrates a control flowchart of the dish washer of FIG. 1 according to various embodiments of the present disclosure.

Referring to FIGS. 1 to 8 and FIGS. 13 to 17, a dish washer 1 may include a cabinet 10 forming the exterior, a washing tub 20 provided inside the cabinet 10, baskets 12a, 12b provided inside the washing tub 20 to receive dishes, nozzles 30, 30a, 30b, 30c, 30d provided to spray water, a sump 15 provided to store water, a circulation pump 16 provided to circulate the water in the sump 15, and a drain pump 17 provided to drain the water of the sump 15 out of the cabinet 10 along with dirt.

The washing tub 20 may have the form of almost a box with the front open to put in or pull out dishes. The washing tub 20 may have a top wall 21, a left wall 22, a right wall, a rear wall 24, and a bottom wall 25. The open front of the washing tub 20 may be opened or closed by a door 11.

The baskets 12a, 12b may be made of wire to support dishes and pass water. The baskets 12a, 12b may include an upper basket 12a and a lower basket 12b arranged in two rows.

The nozzles 30 may include an upper rotary nozzle 30a, a middle rotary nozzle 30b, a lower left fixed nozzle 30c, and a lower right fixed nozzle 30d.

The upper rotary nozzle 30a may spray water downward while being rotated by the water pressure. The middle rotary nozzle 30b may spray water upward and downward while being rotated by the water pressure. The water sprayed from the upper rotary nozzle 30a and the middle rotary nozzle 30b may be sprayed toward the dishes put in the baskets 12a, 12b. The water sprayed from the upper rotary nozzle 30a and the middle rotary nozzle 30b may directly reach the dishes.

The lower left fixed nozzle 30c and the lower right fixed nozzle 30d may be fixed on the rear left and right sides in the back of the washing tub 20, respectively. The water sprayed from the lower left fixed nozzle 30c and the lower right fixed nozzle 30d may be jet toward the front. The water sprayed from the lower left fixed nozzle 30c and the lower right fixed nozzle 30d may be jet toward a reflecting plate 13. The reflecting plate 13 may linearly move toward the front or back and reflect the water sprayed from the lower left fixed nozzle 30c and the lower right fixed nozzle 30d upward.

The reflecting plate 13 may be guided by a rail 14 extending long from front to back. The reflecting plate 13 may be moved by receiving driving power from an extra driver.

The sump 15 is provided to store water. The sump 15 may be arranged at almost a center of the bottom plate 25 of the washing tub 20. The bottom plate 25 of the washing tub 20 may be slantingly formed toward the sump 15 for the water falling down to the bottom plate 25 to flow into the sump 15. The sump 15 may receive water from an external water supplying source (not shown) in the beginning of operation of the dish washer.

The sump 15 may have a filter 19 to filter out dirt from the water flowing into the sump 15 from the washing tub 20. The filter 19 may include a plurality of filters with different sizes of filter holes. For example, it may include a coarse filter with large filter holes to filter out relatively big dirt, a fine filter with a medium-sized filter holes, and a micro filter with micro-sized filter holes.

The circulation pump 16 may be provided to circulate the water of the sump 15. The circulation pump 16 may pump the water stored in the sump 15 to be supplied to the distributor 36 through a circulation path 61.

The distributor 36 may distribute the water supplied from the sump 15 through the circulation path 61 to the respective nozzles 30a, 30b, 30c, and 30d. The distributor 36 may have various combinations of modes to distribute or not to distribute water to each nozzle 30a, 30b, 30c, and 30d.

For example, the distributor 36 may have a supply mode to distribute water to at least one of the nozzles 30a, 30b, 30c, and 30d, and an all-block mode to supply water to none of the nozzles 30a, 30b, 30c, and 30d. The distributor 36 may allow divisional washing to be performed by having only one of the upper nozzle 30a, the middle nozzle 30b, the left fixed nozzle 30c, and the right fixed nozzle 30d to spray water.

The distributor 36 may be implemented in various configurations known to an ordinary person in the art. For example, the distributor 36 may have a cylindrical housing and a cylindrical rotary member rotationally provided inside the housing. The housing may have an inlet connected to the circulation path 61 and a plurality of outlets connected to the respective nozzles 30a, 30b, 30c, and 30d. The rotary member may have a plurality of independent internal paths.

The internal paths may be provided to extend from the inlet to one of the plurality of outlets. Alternatively, the internal paths may be provided to extend from the inlet to two or more of the plurality of outlets.

The distributor 36 may be arranged inside the washing tub 20. The distributor 36 is thus located higher than the sump 15. Accordingly, the water not distributed from the distributor 36 to the nozzles 30a, 30b, 30c, and 30d may flow into the sump 15 due to its own weight, so there may be no water left in the distributor 36.

With this configuration, the circulation pump 16 is driven for the water of the sump 15 to be pumped to the nozzles 30a, 30b, 30c, and 30d, which may in turn spray the water to wash the dishes. The water that has been used for washing falls and is collected into the sump 15 due to the slope of the bottom plate 25 of the washing tub 20, and may then be circulated again by pumping of the circulation pump 16.

The drain pump 17 is configured to drain the water stored in the sump 15 to the outside of the cabinet 10 of the dish washer. The drain pump 17 may drain the water stored in the sump 15 after each washing course, such as pre-washing, main washing, rinsing, etc., is finished.

The dish washer 1 may include a water tank 40 having a reservoir 50 that does not drain but store the water left in the sump 15 after a washing cycle of the dish washer 1 is entirely completed and recycles the water when a new washing cycle begins.

It is common that a single washing cycle includes pre-washing, main washing, rinsing, and drying courses. The rinsing course may include cold rinsing with cold water and hot rinsing with hot water for drying. When each course is finished, the water of the sump 15 may be drained and new water may be supplied to the sump 15 from an external water supplying source.

In this regard, the water stored in the sump 15 after having been used for the rinsing course, which is the final course of one cycle, i.e., the hot rinsing course, is relatively less dirty and rather clean, so the water may not be drained but stored in the water tank 40 to be used for the first course of the next washing cycle, i.e., a pre-washing course. In this way, the recycling of water once used may save water consumption.

The water tank 40 may be provided between the cabinet 10 and the washing tub 20. The water tank 40 may be attached to a side wall of the washing tub 20. Although the water tank 40 is attached on the right wall 23 of the washing tub 20 in this embodiment, it is not limited thereto.

The water tank 40 includes the reservoir 50 for storing water. The reservoir 50 may have an inlet 51 (see FIG. 7) through which water flows in, and an outlet 52 (see FIG. 7) through which water flows out. The inlet 51 and the outlet 52 may be separately provided. The inlet 51 may be arranged in an upper portion of the reservoir 50 and the outlet 52 may be arranged in a lower portion of the reservoir 50.

The water tank 40 may be formed by assembling a water tank inner plate 41 to be combined with the side wall 23 of the washing tub, and a water tank cover 46 provided on the outer side of the water tank inner plate 41. Inner plate ribs 42 for forming the reservoir 50, an inflow path 62 and outflow path 63 as will be described later, may protrude from the water tank inner plate 41, and cover ribs 47 to be coupled with the inner plate ribs 42 may protrude from the water tank cover 46.

The dish washer 1 may include an inflow path 62 provided to supply water to the reservoir 50 of the water tank 40 and an outflow path 63 provided to discharge water of the reservoir 50 of the water tank 40.

The inflow path 62 may branch off at a point 65 of the circulation path 61 and extend to the inlet 51 of the reservoir 50. The outflow path 63 may start from the outlet 52 of the reservoir 50 and join the inflow path 62 at a point 65 of the inflow path 62.

Accordingly, the inflow path 62 may be comprised of a first inflow path 62a extending from the branching point 64 of the circulation path 61 to the joining point 65 of the inflow path 62 and the outflow path 63, and a second inflow path 62b extending from the joining point 65 to the inlet 51 of the reservoir 50.

In the embodiment, the water tank 40 includes part of the inflow path 62, and the outflow path 63. Specifically, part of the inflow path 62 and the outflow path 63 are formed inside the water tank 40. It is not, however, limited thereto, but the inflow path 62 and the outflow path 63 may be formed separately from the water tank 40.

The inflow path 62 and the outflow path 63 may have a first valve 71 and a second valve 72, respectively, to check themselves.

The first valve 71 may be installed in the middle of the inflow path 62. Specifically, the first valve 71 may be installed in the middle of the first inflow path 62a. The first valve 71 may be located between the branching point 64 of the circulation path and the inflow path and the joining point 65 of the inflow path and the outflow path. The first valve 71 may be a check valve to make water flow in one direction and prevent the counter flow.

The second valve 72 may be installed in the middle of the outflow path between the outlet 52 of the reservoir 50 and the joining point 65 of the outflow path and the inflow path. The second valve 72 may be a check valve to make water flow in one direction and prevent the counter flow.

The first valve 71 and the second valve 72 may each be an open/close valve for opening the path to allow the water flow or closing the path to block the water flow. Accordingly, in accordance with an embodiment of the present disclosure, without need to use a path switching valve in a complicated structure, the water may be guided between the sump 15 and the water tank 40, leading to reduction of the risk of malfunction and breaking but to an increase in reliability.

The first valve 71 may be provided at a position higher than the sump 15 but lower than the distributor 36. The second valve 72 may be provided at a position higher than the first valve 71.

Various known valves to open/close the flow path may be used for the first valve 71 and the second valve 72, but considering that the water contains dirty materials, it is desirable to use thermostatic valves.

As shown in FIG. 8, an outflow hole 66 connecting the outlet 52 of the reservoir 50 and the outflow path 63 may be formed on the water tank 40. The second valve 72 may include a valve body 73 provided to move forward and backward, and the valve body 73 may open or close the outflow hole 66 by moving forward or backward, so that the outflow path 63 may be opened or closed.

With this configuration, the dish washer 1 may have a washing mode to supply water from the sump 15 to the nozzles 30a, 30b, 30c, 30d to wash dishes, a storing mode to supply water from the sump 15 to the reservoir 50 to store water in the reservoir 50, a cleaning mode to store water in the reservoir 50 and at the same time, clean the filter 19 of the sump 15, and a retrieval mode to retrieve the water stored in the reservoir 50 to the sump 15.

As shown in FIG. 16, the dish washer 1 may have a controller 2 for controlling the distributor 36, the first valve 71, the second valve 72, the circulation pump 16, and the drain pump 17.

In the washing mode, the controller 2 may switch to the supply mode to have the distributor 36 distribute water to one nozzle 30 of the at least one nozzles, block the first valve 71, and drive the circulation pump 16. In the washing mode, the water of the sump 15 may be supplied to the nozzle 30 through the circulation path 61 and the distributor 36, and the water may be jet from the nozzle 30 and wash dishes.

In the storing mode, the controller 2 may switch to the all-block mode to have the distributor 36 distribute water to none of the at least one nozzles, open the first valve 71, block the second valve 72, and drive the circulation pump 16. In the storing mode, the water of the sump 15 may be stored in the reservoir 50 through the inflow path 62.

In the storing mode, as shown in FIG. 13, the water of the sump 15 may go up to the inlet 51 of the reservoir 50 through the inflow path 62.

As shown in FIG. 14, when water of the sump 15 keeps flowing into the reservoir 15 through the inflow path 62 after it goes up to the inlet 51 of the reservoir 50, it begins to gradually fill the reservoir 50 from the bottom.

As shown in FIG. 15, if the water keeps flowing in and the water level of the reservoir 50 reaches a predetermined level, water being overly supplied may be guided into the washing tub 20 through an overflow path 68. Specifically, the water tank 40 may include the overflow path 68 for guiding the water overly supplied into the washing tub 20, and the overflow path 68 may be provided separately from the outflow path 52. The water guided through the overflow path 68 may be guided into the washing tub 20 through a discharging port 83.

In the storing mode, the water directed from the inflow path 62 toward the reservoir 50 falls by its own weight when it goes up to the inlet 51 of the reservoir 50, so the circulation pump 16 may receive as big a load as to raise the water of the sump 15 to the inlet 51 of the reservoir 50.

In the cleaning mode, the controller 2 may switch to the supply mode to have the distributor 36 distribute water to one nozzle 30 of the at least one nozzles, open the first valve 71, block the second valve 72, and drive the circulation pump 16.

In the cleaning mode, some of the water of the sump 15 may be supplied to the nozzle 30 through the circulation path 61 and the distributor 36, and some of the remaining water may be stored in the reservoir 50 through the inflow path 62.

In the cleaning mode, since only some of the water of the sump 15 is supplied to the nozzle 30, the jet force of the nozzle 30 may become weak. Accordingly, the water injected from the lower nozzles 30c, 30d may just reach the sump 15 located in almost the center of the washing tub 20 by the weak jet force, and wash the filter 19 equipped in the sump 15.

In the retrieval mode, the controller 2 may open the first valve 71 and the second valve 72. The water stored in the reservoir 50 may be retrieved to the sump 15 by its own weight through the outflow path 63 and the inflow path 62.

Control flows of the washing and rinsing courses of the dish washer may be implemented in various methods. An example may be taken from what is shown in FIG. 17. In FIG. 17, washing may include a washing course and a rinsing course.

The dish washer 1 determines an operation mode, in 100. The operation mode may be one of three modes: washing mode, washing and storing mode, and washing and cleaning mode.

Subsequently, it is determined whether the operation mode is the washing mode in 110, and if it is the washing mode, the distributor 36 is switched to the supplying mode to supply water to at least one nozzle 30 of the nozzles, the first valve 71 is closed, and the circulation pump 16 is activated, in 111. Washing is performed for a predetermined period of time, in 112, and after the lapse of the predetermined period of time, it is determined whether the washing is done, in 113. If the washing is done, the drain pump 17 is activated to drain the water of the sump 15, in 114.

On the other hand, if the operation mode is not the washing mode, it is determined whether the operation mode is the washing and storing mode, in 120. If it is the washing and storing mode, the distributor 36 is switched to the supplying mode to supply water to at least one nozzle 30 of the nozzles, the first valve 71 is closed, and the circulation pump 16 is activated, in 121. Washing is performed for a predetermined period of time, in 122, and after the lapse of the predetermined period of time, it is determined whether the washing is done, in 123. If the washing is done, the distributor 36 is switched to the all-block mode to distribute water to none of the at least one nozzles, the first valve 71 is opened, the second valve 72 is blocked, and the circulation pump 16 is activated, in 124. Water is stored in the reservoir 50 until the reservoir 50 is full of the water, in 125, and it is checked if the reservoir 50 is full of the water, in 126.

On the other hand, if the operation mode is not washing and storing mode in 120, it is determined whether the operation mode is the washing and cleaning mode, in 130. If it is the washing and cleaning mode, the distributor 36 is switched to the supplying mode to supply water to at least one nozzle 30 of the nozzles, the first valve 71 is closed, and the circulation pump 16 is activated, in 131. Washing is performed for a predetermined period of time, in 132, and after the lapse of the predetermined period of time, it is determined whether the washing is done, in 133. If the washing is done, the distributor 36 is switched to the supply mode to distribute water to one nozzle 30 of the at least one nozzles, the first valve 71 is opened, the second valve 72 is blocked, and the circulation pump 16 is activated, in 134. Storing and cleaning is performed until the predetermined period of time has elapsed or the reservoir 50 is full of water, in 135, and it is checked whether the storing and filter cleaning is completed, in 136.

Since the aforementioned control flows show an example of control flows using the dish washer and include a plurality of washing and rinsing courses in each cycle, the control flows may be repeated as many as the number of washing and rinsing courses. Alternatively, the control flows may be applied to a final rinsing course in one washing cycle.

Figure 9:
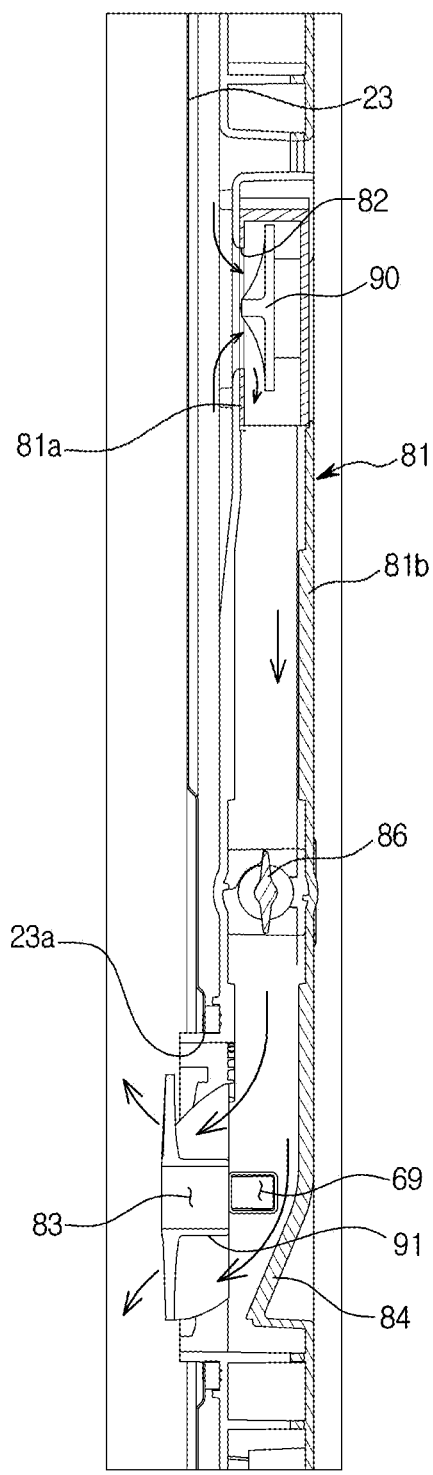
FIG. 9 illustrates a side cross-sectional view illustrating a dryer attached to the washing tub of the dish washer of FIG. 1 according to an embodiment of the present disclosure.
Figure 10:
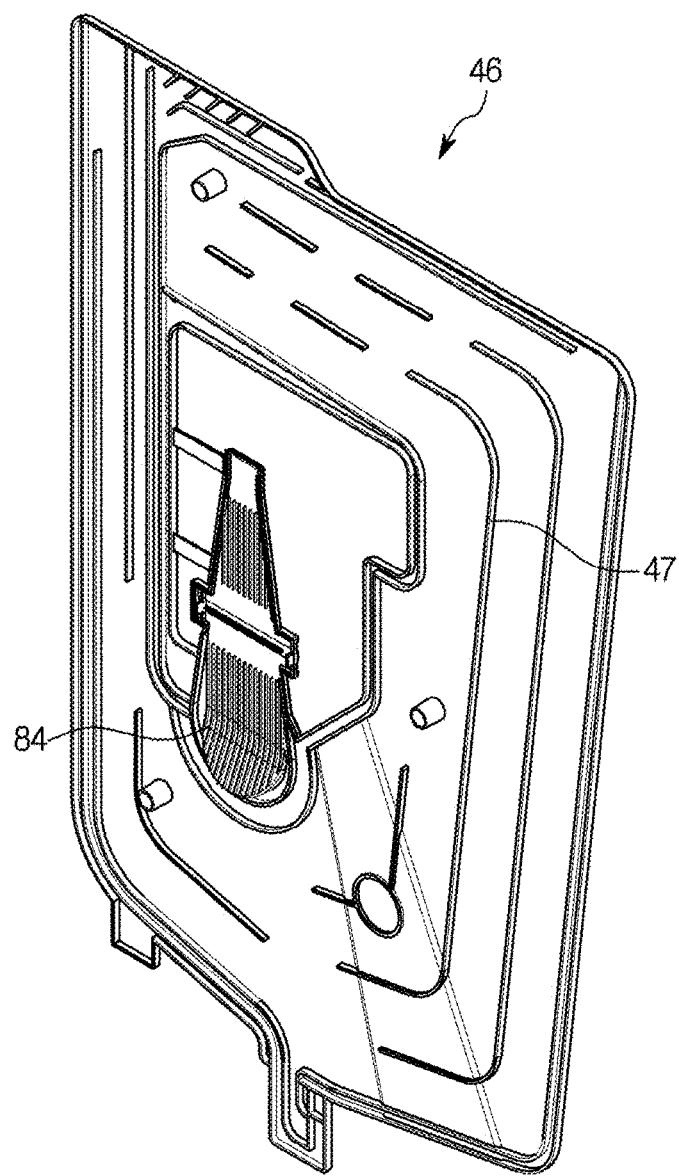
FIG. 10 illustrates a water tank cover of the dish washer of FIG. 1 according to various embodiments of the present disclosure.
Figure 11:
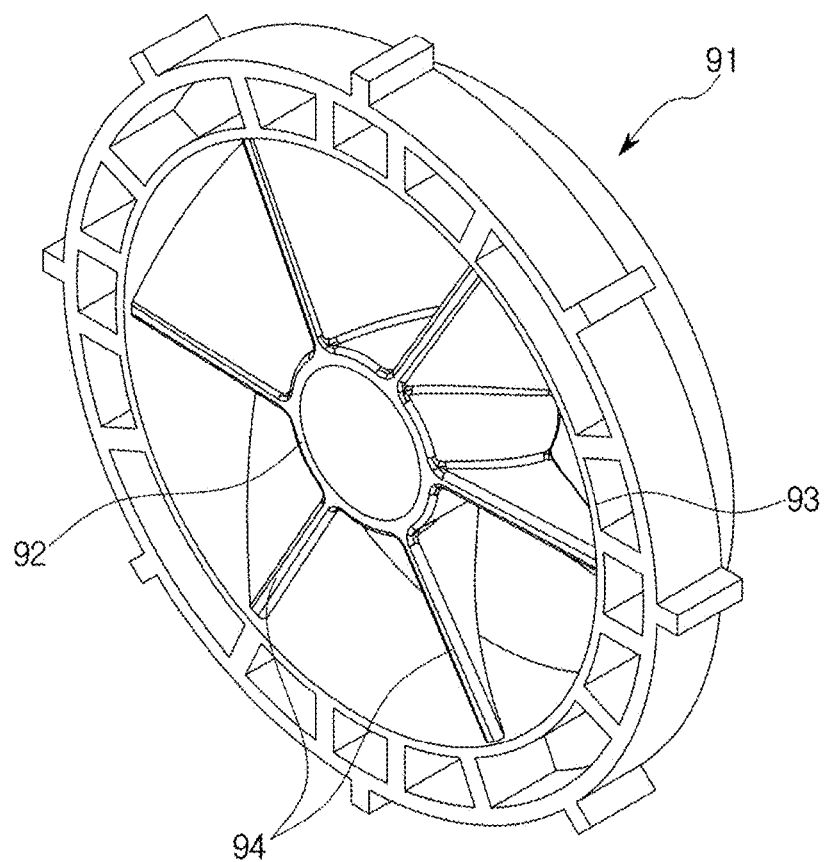
FIG. 11 illustrates a perspective view of a diffuser of the dryer of the dish washer of FIG. 1 according to various embodiments of the present disclosure.
Figure 12:
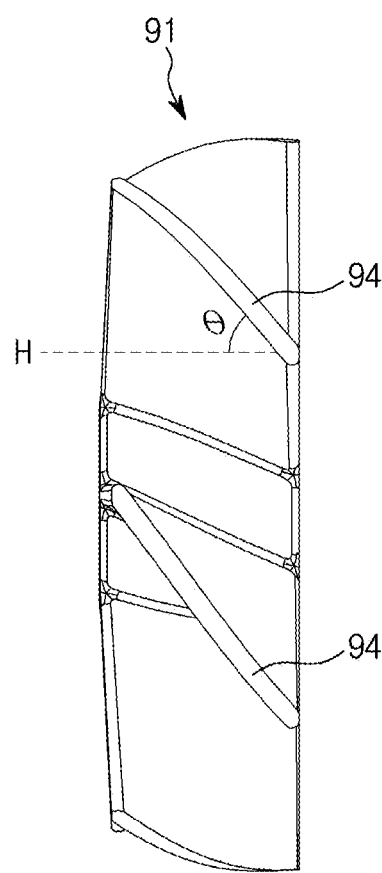
FIG. 12 illustrates a side cross-sectional view of a diffuser of the dryer of the dish washer of FIG. 1 according to various embodiments of the present disclosure.

FIG. 9 illustrates a side cross-sectional view illustrating a dryer attached to the washing tub of the dish washer of FIG. 1 according to various embodiments of the present disclosure. FIG. 10 illustrates a water tank cover of the dish washer of FIG. 1 according to various embodiments of the present disclosure. FIG. 11 illustrates a perspective view illustrating a diffuser of the dryer of the dish washer of FIG. 1 according to various embodiments of the present disclosure. FIG. 12 illustrates a side cross-sectional view illustrating a diffuser of the dryer of the dish washer of FIG. 1 according to various embodiments of the present disclosure.

Referring to FIGS. 4 to 12, a dryer of the dish washer in accordance with an embodiment of the present disclosure will be described.

The dish washer 1 may include the dryer 80 for sucking in air from the outside of the washing tub 20 and discharge the air into the washing tub 20. The dryer 80 facilitates drying of dishes received in the washing tub 20 by blowing air toward the dishes during the drying course of the dish washer 1.

The dryer 80 may be attached to a side wall 23 of the washing tub 20, and there may be an opening 23a (see FIG. 5 or 9), through which the air discharged from the dryer 80 flows into the washing tub 20, formed on the side wall 23 with the dryer 80 attached thereto.

The dryer 80 may include a blower fan 90 for moving air and a duct 81 for guiding the air sucked in by the blower fan 90. The blower fan 90 may be a centrifugal fan that sucks in air in the axial direction and discharge the air in the circumferential direction.

In the embodiment, the duct 81 of the dryer 80 is integrally formed with the water tank 40, without being limited thereto. In another embodiment, the dryer 80 may be formed separately from the water tank 40.

The duct 81 is formed to extend long in the vertical direction. The duct 81 may be formed to have wider width in the vertical direction. The duct 81 may have a sucking port through which air is sucked in and a discharging port 83 through which air is discharged, and the sucking port 82 may be formed in a top portion of the duct 81 and the discharging port 83 may be formed in a bottom portion of the duct 81. Both the sucking port 82 and the discharging port 83 may be formed toward the washing tub 20. The duct 81 may include an inner duct 81a coupled to the side wall 23 of the washing tub 20, and an outer duct 81b coupled to the inner duct 81a.

The sucking port 82 may be formed at a certain distance away from the side wall 23 of the washing tub 20 so as to suck in air from outside of the washing tub 20, and the discharging port 83 may be formed to link to the opening 23a of the side wall 23 of the washing tub 20. The blower fan 90 is provided to be adjacent to a top portion of the duct 81, i.e., to the sucking port 82.

This structure may prevent water flowing into the duct 81 through the opening 23a on the side wall of the washing tub 20 from permeating to the blower fan 90 during the washing and rinsing courses of the dish washer 1.

Furthermore, the duct 81 may have a slope 84 enabling the water flowing into the duct 81 to continue to flow to the discharging port 83 by its own weight without being collected inside the duct 81.

The dryer 80 may include a damper 86 provided between the sucking port 82 and the discharging port 83 to open or close the duct 81, and a driver 87 to drive the damper 86. The damper 86 may close the duct 81 to prevent the water flowing in through the discharging port 83 from permeating to the blower fan 90 arranged to be adjacent to the sucking port 82 during the washing and rinsing courses of the dish washer. The damper 86 may allow the air sucked in by the blower fan 90 to flow into the washing tub 20 by opening the duct 81 in the drying course.

A diffuser 91 may be provided in the discharging port 83 to spread the air being discharged through the discharging port 83 to a wide range, thereby increasing the drying efficiency.

The diffuser 91 may spread the air to a wide range so that the air makes direct contact with many dishes. The diffuser 91 may spread the air in a swirling form.

As shown in FIGS. 11 and 12, for example, the diffuser 91 may include a hub 92 in the center, an outer rim 93, and a plurality of wings 94 radially extending between the hub 92 and the rim 93. The wings 94 may be slantingly formed. The wings 94 may be formed to be inclined at a certain angle $\theta$ from the horizon H.

Figure 18:
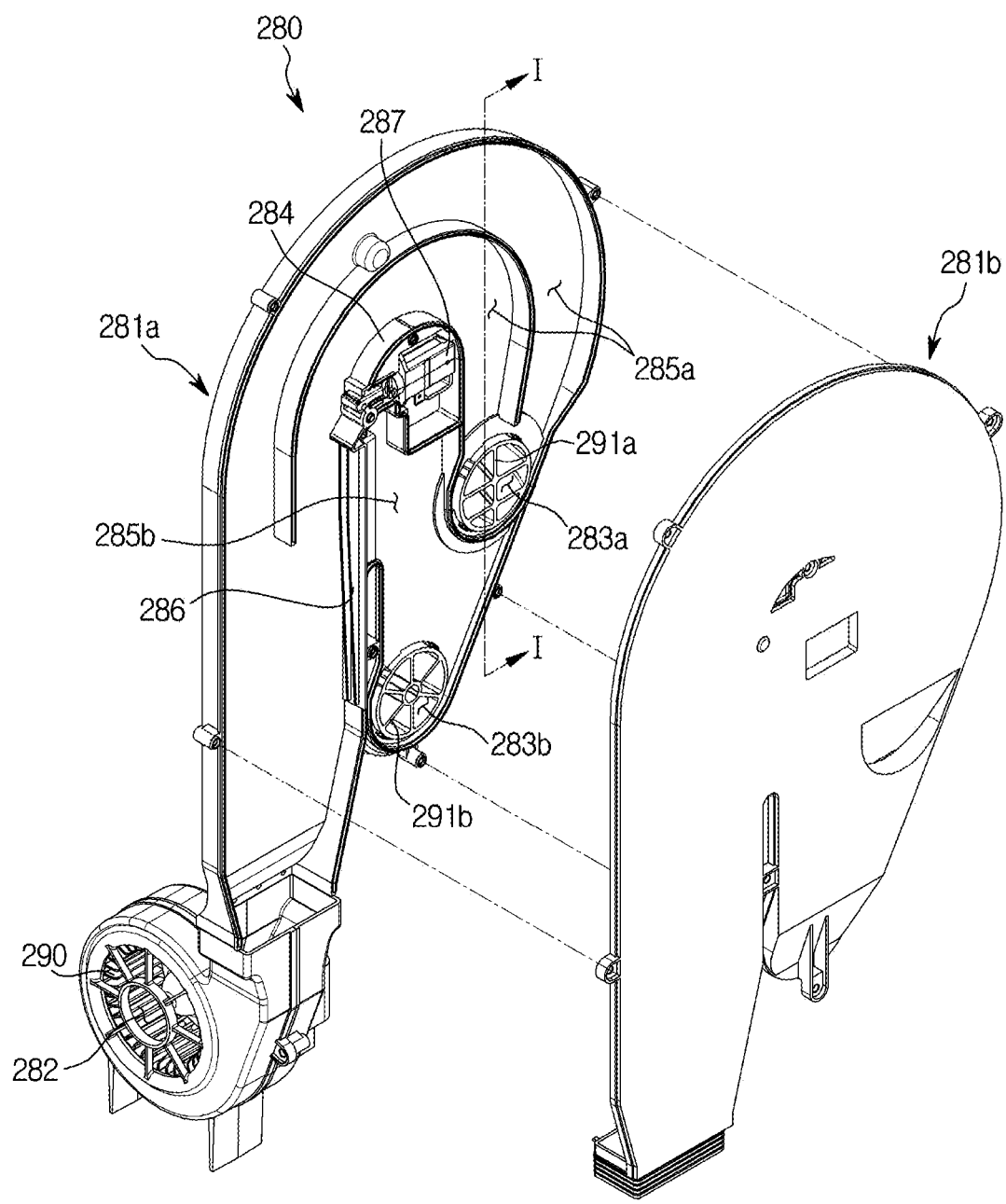
FIG. 18 illustrates an exploded view of a dryer, according to various embodiments of the present disclosure.
Figure 19:
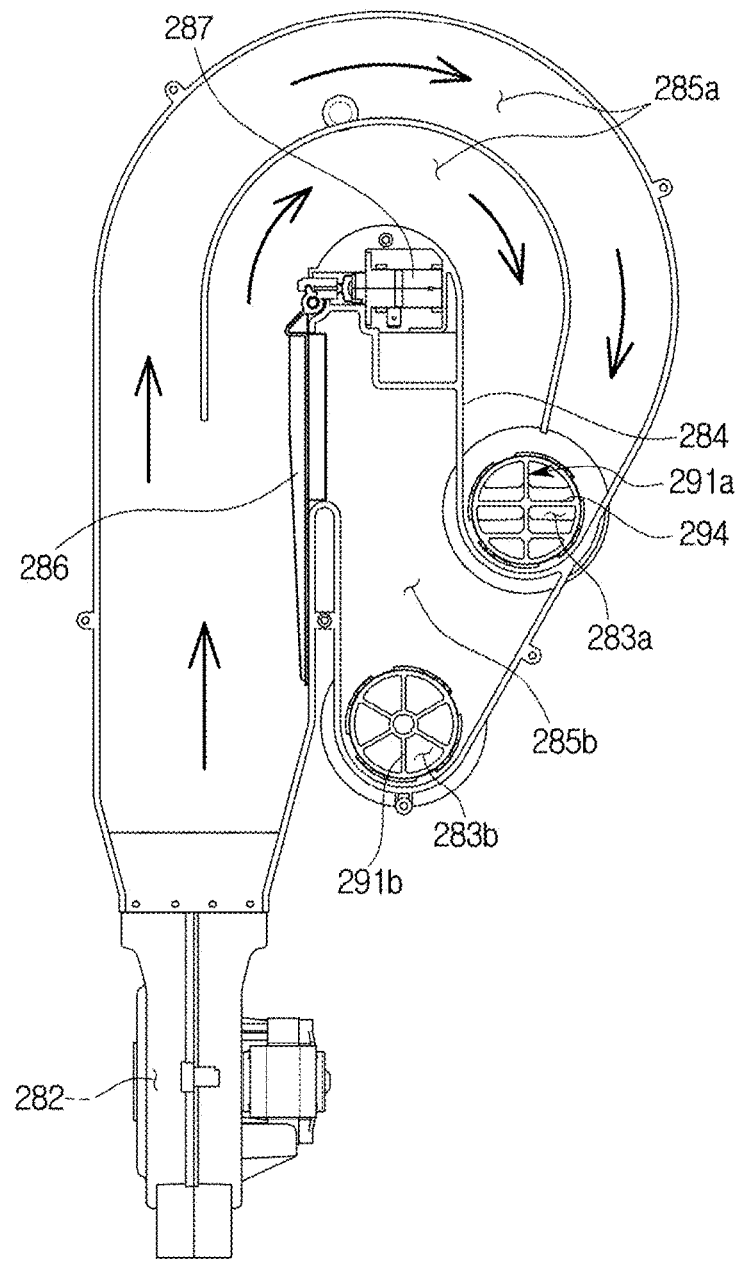
FIGS. 19 and 20 illustrates operation of the dryer of FIG. 18 according to various embodiments of the present disclosure.
Figure 20:
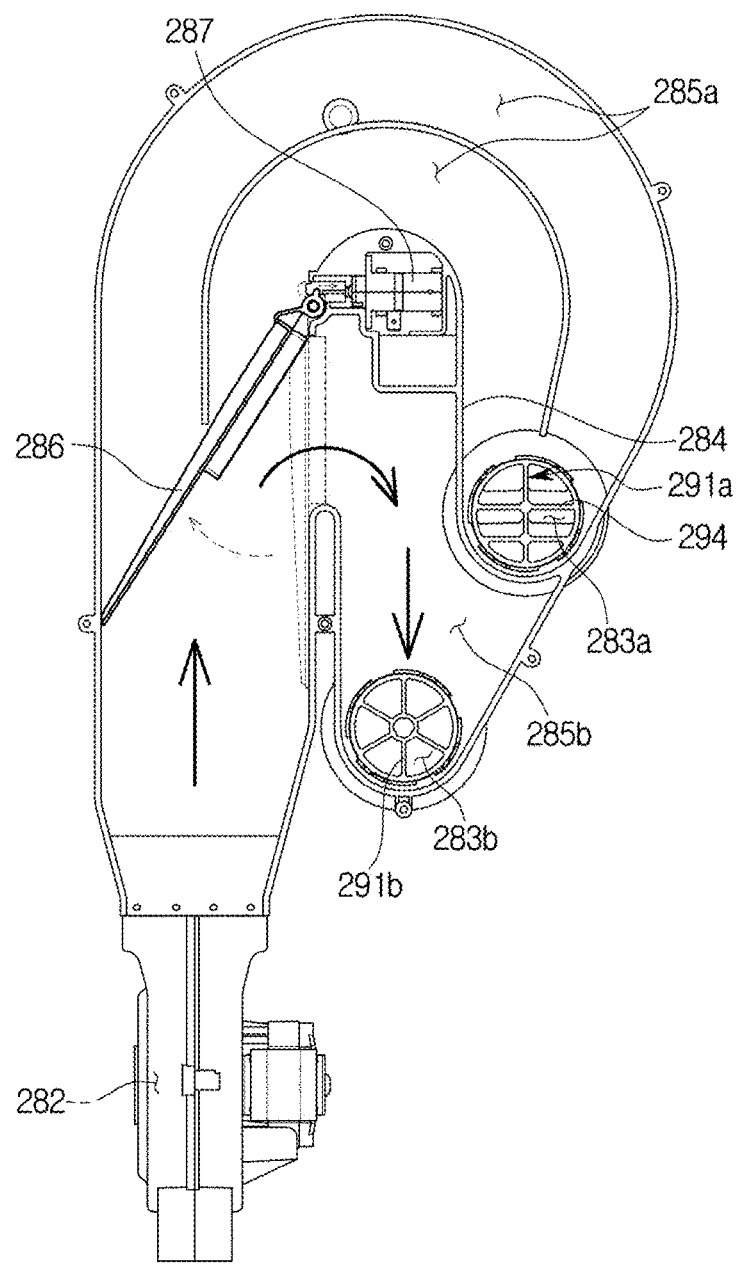
Figure 21:
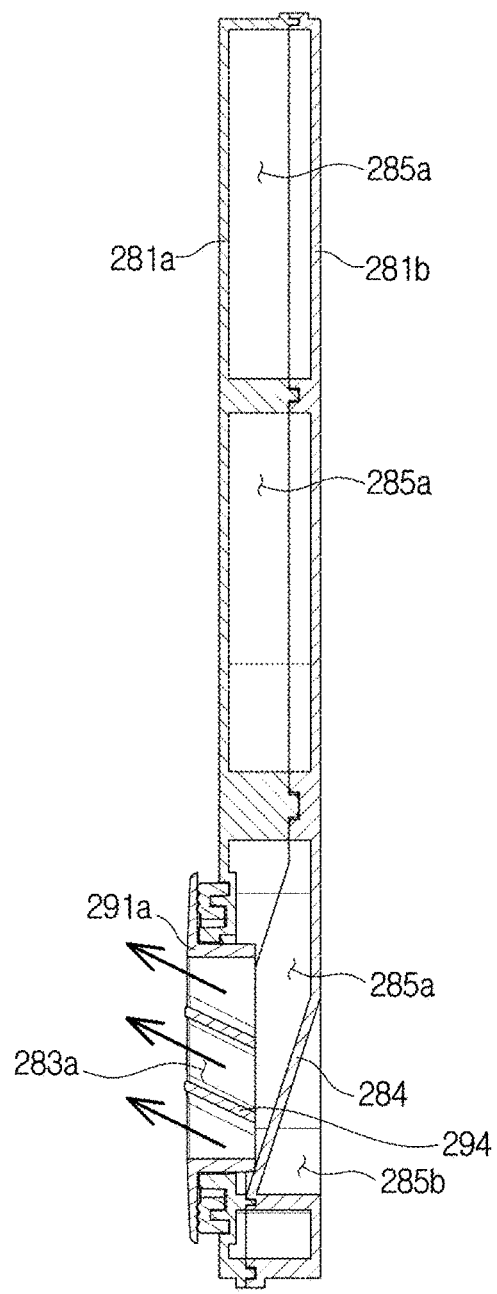
FIG. 21 illustrates a cross-sectional view of portion I-I of FIG. 18 according to various embodiments of the present disclosure.

FIG. 18 illustrates an exploded view of a dryer, according to another embodiment of the present disclosure according to various embodiments of the present disclosure. FIGS. 19 and 20 illustrate operation of the dryer of FIG. 18. FIG. 21 illustrates a cross-sectional view of portion I-I of FIG. 18 according to various embodiments of the present disclosure.

Referring to FIGS. 18 to 21, a dryer in accordance with another embodiment of the present disclosure will be described. The same features as in the aforementioned embodiment will be omitted herein.

A dryer 280 may include a blower fan 290 for moving air and a duct 281 for guiding the air sucked in by the blower fan 290. The duct 281 may include an inner duct 281a coupled to the side wall 20 of the washing tub 20, and an outer duct 281b coupled to the inner duct 281a.

The duct 281 may have a sucking port 282 through which air is sucked in, and a plurality of discharging ports 283a, 283b through which air is discharged. Unlike in the previous embodiments, the dryer 280 may discharge air into a plurality of regions through the plurality of discharging ports 283a, 283b. Accordingly, the inside of the washing tub 20 may be more evenly dried without a blind spot.

In the embodiment, there may be a plurality of discharging ports, but there is no limitation on the number of the discharging ports and more or less discharging ports may be provided. The plurality of discharging ports 283a, 283b may be formed at proper locations to evenly dry the inside of the washing tub 20. For example, the first discharging port 283a may be provided at a location to send the air to a lower portion of the washing tub 20 and the second discharging port 283b may be provided at a location to send the air to a middle portion of the washing tub 20. However, there are no limitations on the locations of the first and second discharging ports 283a and 283b.

The duct 281 may have a plurality of guiding paths 285a, 285b for guiding the air sucked in through the sucking port 283 to the plurality of discharging ports 283a, 283b, and a guide wall 284 for separating the plurality of guiding paths 285a, 285b.

The dryer 280 may have a path switching damper 286 provided to select one of the first guiding path 285a and the second guiding path 285b, and a driver for driving the path switching damper 286.

The air sucked in through the sucking port 282 may be guided through one of the first guiding path 285a and the second guiding path 285b by the path switching damper 286.

As shown in FIG. 19, the path switching damper 286 may force the air sucked in through the sucking port 282 to be discharged through the first discharging port 283a by blocking the second guiding path 285b and opening the first guiding path 285a.

As shown in FIG. 20, the path switching damper 286 may force the air sucked in through the sucking port 282 to be discharged through the second discharging port 283b by blocking the first guiding path 285a and opening the second guiding path 285b.

With this configuration, the dish washer 1 may control discharging sequence and time for discharging air through the plurality of discharging ports 283a, 283b. For example, it may first discharge air to a relatively less-dried area for a relatively long time in the beginning of the drying course in which dishes are put under a relatively high temperature, thereby increasing the drying efficiency and shortening the drying time.

Diffusers 291a, 291b may be provided in the discharging ports 283a, 283b, respectively, to change directions of air being discharged through the discharging ports 283a, 283b or spread the discharged air to a wide range to increase the drying efficiency.

The diffusers 291a, 291b may have a suitable shape taking into account the positions of the dishes in the washing tub 20 and the positions of the discharging ports 283a, 283b such that the air discharged through the discharging ports 283a, 283b is directed to the dishes.

For example, the diffuser 291a arranged in the first discharging port 283a of an upper portion may have sloping wings 294 to form upstream air, and the diffuser 291b arranged in the second discharging port 283b of a lower portion may form a straightforward airflow.

According to embodiments of the present disclosure, water may be stored in the water tank and recycled with little load, so that energy may be saved and hygiene may be improved because filter cleaning is easy and no remaining water is left in the distributor.

According to embodiments of the present disclosure, air spreads evenly inside the dish washer, leading to an increase in drying efficiency and preventing moisture from being collected in the dryer, thereby improving reliability of the dryer.

Although the present disclosure has been described with various embodiments, various changes and modifications may be suggested to one skilled in the art. It is intended that the present disclosure encompass such changes and modifications as fall within the scope of the appended claims.

What is claimed is:

1. A dish washer comprising:
   a sump;
   at least one nozzle configured to inject water;
   a distributor configured to receive water of the sump and distribute the water to the at least one nozzle;
   a reservoir configured to receive the water of the sump and store the water;
   a circulation path configured to connect the sump and the distributor;
   an inflow path configured to branch off from the circulation path to supply the water of the sump to the reservoir;
   a first valve provided in a middle of the inflow path, wherein the first valve is configured to open or close the inflow path;
   an outflow path configured to flow the water out of the reservoir, the outflow path including a first end coupled to the reservoir and a second end coupled to the inflow path; and
   a second valve configured to open or close the outflow path.

2. The dish washer of claim 1, wherein the water of the reservoir flows out to the sump when both the first valve and the second valve are opened.

3. The dish washer of claim 2, wherein the first valve is provided between a branching point of the circulation path and the inflow path and the second end of the outflow path coupled to the inflow path.

4. The dish washer of claim 2, wherein the second valve is provided between the reservoir and the second end of the outflow path coupled to the inflow path.

5. The dish washer of claim 1, wherein the first valve is provided at a position higher than the sump and lower than the distributor.

6. The dish washer of claim 1, wherein the second valve is provided at a position higher than the first valve.

7. The dish washer of claim 1, wherein:
the reservoir has an inlet linked to the inflow path and an outlet linked to the outflow path, and
the inlet and the outlet are separate from each other and located in different positions.

8. The dish washer of claim 7, wherein the inlet is provided at a position higher than the outlet.

9. The dish washer of claim 1, further comprising: a water tank including the reservoir.

10. The dish washer of claim 9, wherein the water tank comprises at least a part of the inflow path and at least a part of the outflow path.

11. The dish washer of claim 9, further comprising: a washing tub,
wherein the water tank comprises an overflow path configured to guide overly supplied water into the washing tub.

12. A method for controlling a dish washer including a sump, at least one nozzle to inject water, a distributor, a reservoir, a circulation path connecting the sump and the distributor, an inflow path branched off from the circulation path, a first valve provided in a middle of the inflow path, an outflow path including a first end coupled to the reservoir and a second end coupled to the inflow path and a second valve, the method comprising:
receiving, at the distributer, water of the sump;
distributing, by the distributer, the water to the at least one nozzle;
opening or closing, using the first valve, the inflow path to supply the water of the sump to reservoir;
receiving and storing, in the reservoir, the water of the sump; and
opening or closing, using the second valve, the outflow path of the dish washer, to flow the water out of the reservoir.

13. The method of claim 12, further comprising:
blocking a water supply to the at least one nozzle through the circulation path;
opening the inflow path;
closing the outflow path; and
activating a pump provided to circulate water of the sump.

14. The method of claim 12, further comprising:
allowing a water supply to the at least one nozzle through the circulation path;
opening the inflow path;
closing the outflow path; and
activating a pump provided to circulate water of the sump.

15. The method of claim 12, further comprising: opening the inflow path and the outflow path.

16. A dish washer comprising:
a cabinet;
a washing tub provided inside the cabinet the washing tub includes an opening; and
a dryer provided between the cabinet and the washing tub configured to suck in air from outside of the washing tub and discharge the air into the washing tub through the opening of the washing tub, wherein the dryer comprises:
a duct extending in a vertical direction, the duct including:
a sucking port formed in a top portion of the duct, configured to suck in air from an outside of the washing tub into the duct, and
a discharging port formed in a bottom portion and linked to the opening of the washing tub; and
a blower fan provided adjacent to the sucking port.

17. The dish washer of claim 16, wherein the duct comprises a slope to guide water flowing into the duct to the discharging port.

18. The dish washer of claim 16, wherein the dryer further comprises a damper provided between the sucking port and the discharging port, wherein the damper is configured to open or close the duct.

19. The dish washer of claim 16, wherein:
the dryer further comprises a diffuser provided in the discharging port to spread air that is discharged through the discharging port, and
the diffuser comprises a hub, a rim, and a wing that extends from the hub to the rim in a radial direction and is slanted.

20. The dish washer of claim 16, further comprising: a sump, and a water tank equipped on the outside of the washing tub configured to receive water of the sump and store the water,
wherein the duct and the water tank are integrally formed.

* * * * *